(12) United States Patent
Rinaldi et al.

(10) Patent No.: US 6,327,002 B1
(45) Date of Patent: Dec. 4, 2001

(54) METHOD AND APPARATUS FOR VIDEO SIGNAL PROCESSING IN A VIDEO SYSTEM

(75) Inventors: Antonio Rinaldi, Maple; Collis Quinn Carter, Toronto, both of (CA)

(73) Assignee: ATI International, Inc., Hastings (BB)

( * ) Notice: Subject to any disclaimer, the term of this patent is extended or adjusted under 35 U.S.C. 154(b) by 0 days.

(21) Appl. No.: 09/183,884

(22) Filed: Oct. 30, 1998

(51) Int. Cl.[7] ................................................. H04N 3/27
(52) U.S. Cl. .................... 348/554; 348/552; 348/663; 345/154
(58) Field of Search ................................... 348/663, 664, 348/665, 667, 552, 554, 556, 558, 705, 706; 345/154

(56) References Cited

U.S. PATENT DOCUMENTS

| | | | |
|---|---|---|---|
| 5,650,831 | * 7/1997 | Farwell | 348/734 |
| 5,835,729 | * 11/1998 | Moreton et al. | 348/664 |
| 5,844,629 | * 12/1998 | Murray et al. | 348/642 |
| 5,850,266 | * 12/1998 | Gimby | 348/558 |
| 5,982,453 | * 11/1999 | Willis | 348/607 |
| 6,008,858 | * 12/1999 | Swan et al. | 348/523 |
| 6,091,429 | * 7/2000 | Yassaie et al. | 345/509 |
| 6,098,174 | * 8/2000 | Baron et al. | 365/229 |
| 6,172,712 | * 1/2001 | Beard | 348/552 |

* cited by examiner

Primary Examiner—Reinhard J. Eisenzopf
Assistant Examiner—Trang U. Tran

(57) ABSTRACT

A method and apparatus for processing video signals to a plurality of video outputs may be done within a video system that includes a video decoder, a digital-to-analog module, and an output control module. In such a video system, the video decoder includes an analog-to-digital conversion module for converting an input video signal(s) into a digital video signal(s). The video decoder further includes a comb filter that is operably coupled to receive the digital video signal and to produce therefrom a Y component digital signal and a C component digital signal. The output control module is operably coupled to receive the Y and C component digital signals and also to receive an output command. If the output command dictates, the output control module provides the Y and C component digital signals to the digital-to-analog module. In response, the digital-to-analog module produces a composite video output and an S video output.

18 Claims, 3 Drawing Sheets

METHOD AND APPARATUS FOR VIDEO SIGNAL PROCESSING IN A VIDEO SYSTEM

TECHNICAL FIELD OF THE INVENTION

This invention relates generally to video processing and more particularly to processing video signals to a plurality of different video outputs.

BACKGROUND OF THE INVENTION

Computers are known to include a central processing unit, system memory, video graphics circuitry, audio processing circuitry, and peripheral ports. The peripheral ports allow the central processing unit to interface with peripheral devices such as a keyboard, a mouse, displays, external memory, etc. The audio processing circuitry receives digital audio signals from the central processing unit and produces analog signals that are provided to speakers. The video graphics processing circuitry receives graphics data from the central processing unit and processes it to produce pixel data. The pixel data, which is typically generated in a RGB format (red, green, blue), is subsequently displayed by a display such as a CRT monitor, LCD panel, etc.

The video graphics circuitry may further include video decoders and/or video encoders such that they may process video signals. Video signals are generally produced by video sources such as television broadcasts, VCRs, DVD players, camcorders, etc. As such, the computer is capable of displaying video signals on the display. Additionally, the computer may include a composite video output port and an S-video output port, which allow video signals to be sourced to a television.

In current implementations of video graphics circuitry, video input data, once processed, is treated similarly to graphics data. As is known, video data is converted to video graphics data via the video decoder and supplied to a graphics controller. The graphics controller manipulates the data and stores it in a frame buffer for a subsequent display on the computer monitor. If the video data is to be outputted to a television via the composite video output or the S-video output, the graphics controller retrieves the data from the frame buffer and provides it to a video encoder. As such, when computer received video signals are to be displayed on a television set, they are still processed by the graphics controller and stored in the frame buffer. Once stored in the frame buffer, the graphics controller retrieves the data and provides it to the video encoder. Thus, extra processing is done, which reduces the overall efficiency of a computing system and adds to the cost of such a system.

Therefore, a need exists for a method and apparatus for processing video signals to a plurality of video outputs with minimal extra processing.

DETAILED DESCRIPTION OF A PREFERRED EMBODIMENT

Generally, the present invention provides a method and apparatus for processing video signals to a plurality of video outputs. Such processing may be done within a video system that includes a video decoder, a digital-to-analog module, and an output control module. In such a video system, the video decoder includes an analog-to-digital conversion module for converting an input video signal(s) into a digital video signal(s). The video decoder further includes a comb filter that is operably coupled to receive the digital video signal and to produce therefrom a Y component digital signal and a C component digital signal. The output control module is operably coupled to receive the Y and C component digital signals and also to receive an output command. If the output command dictates, the output control module provides the Y and C component digital signals to the digital-to-analog module. In response, the digital-to-analog module produces a composite video output and an S video output. With such a method and apparatus, a video signal may be processed to a plurality of video sources with reduced processing. In one application, the video graphics controller is bypassed when a video input signal is to be provided to a video output of a computing system.

Figure 1:
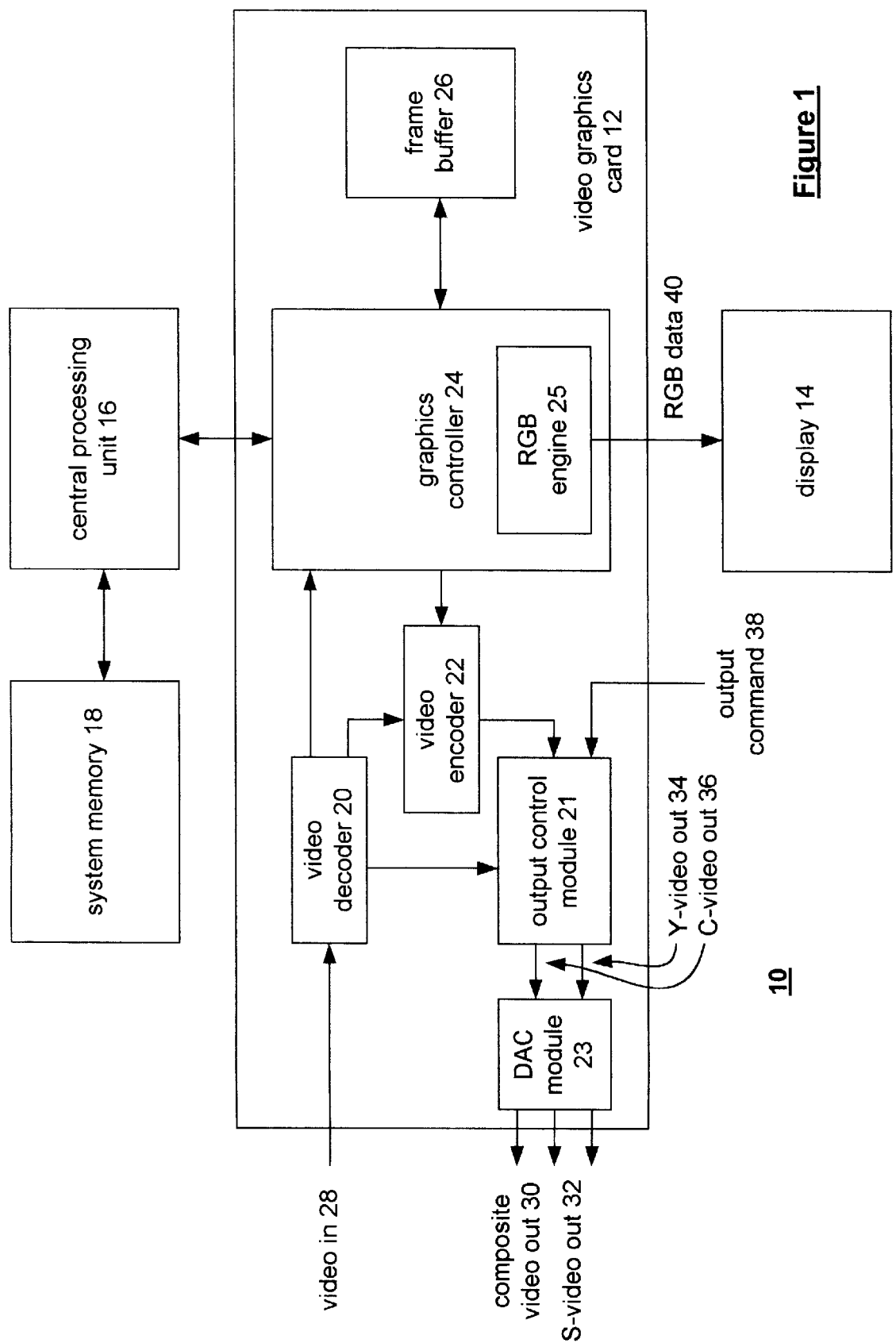
FIG. 1 illustrates a schematic block diagram of a computing system in accordance with the present invention.

The present invention can be more fully described with reference to FIGS. 1 through 4. FIG. 1 illustrates a schematic block diagram of a computing system 10 in accordance with the present invention. Such a computing system 10 may be a personal computer, video game, laptop computer, palm computer, personal digital assistant (PDA), etc. The computing system 10 includes a video graphics card 12, central processing unit 16, system memory 18, and a display 14. The central processing unit 16 may include a microprocessor or a plurality of microprocessors as is/are typically found in a personal computer, a laptop, etc. The system memory includes random access memory and read-only memory as is typically found in a personal computer, a laptop, a video game, etc. The display 14 may be a CRT display, LCD flat panel display, high definition television, etc.

The video graphics card 12 includes a video decoder 20, an output control module 21, a video encoder 22, a digital-to-analog converter module 23, a graphics controller 24, and a frame buffer 26. The video decoder 20 is operably coupled to receive video input signals 28 and to produce therefrom Y, Cr, Cb video data which is provided to the graphics controller 24 and may also be provided to the video encoder 22. In addition, the video decoder 20 is operably coupled to the output module 21. This coupling allows the Y component digital signal and C component digital signal to be provided directly from the video decoder 20 to the output control module 21. When an output command 38 is active, the output module 21 provides the Y and C component digital signals to the DAC module 23. The DAC module 23 converts these signals into an analog composite video output 30 and an S video output 32.

When the output module 21 is configured, based on the output command 38, to provide the Y and C digital signals to the DAC directly, the video input signals 28 are not processed by the graphics controller 24 prior to being provided to the DAC module 23. As such, the video decoder 20 to output control module 21 provides a graphics controller 24 by-pass, such that the video input signals 28 are provided more directly to the video outputs 30 and/or 32. The by-pass is particularly useful when converting the video signal from one standard into another standard. The video inputs signal 28 may be formatted in accordance with the NTSC video standard, the PAL video standard and/or the SECAM video standard. As such, a video input signal 28 formatted in accordance with the NTCS can be outputted in accordance with the PAL standard or the SECAM standard. The video decoder 20, using known techniques, performs the standard conversion.

The video encoder 22 is operably coupled to receive video signals from either the video decoder 20 or the graphics controller 24. When receiving video signals from the video decoder 20, the video encoder 22 processes the signals using known techniques and provides them to the output control module 21. As such, a second graphics controller by-pass path is created via the video encoder 22. As mentioned, when the graphics controller can be by-passed for video signals, processing resources of the graphics controller 24 are preserved.

The graphics controller 24 includes an RGB (red, green, blue) engine 25 that produces RGB data 40. The graphics controller 24 produces the RGB data 40 via the RGB engine upon receiving graphics data from the central processing unit 16 and/or by receiving video signals from the video decoder 20. In either case, the input signals are processed to produce the RGB data 40. The graphics controller 24 is further coupled to the video encoder 22. In this implementation, the graphics controller outputs the RGB data to the video encoder 22 which in turn produces a signal provided to the output module 21. As such, the graphics controller 24 may provide graphics data, which was originated by the central processing unit 16, to the video encoder 22, or processed video data that was received by video decoder 20.

With the bypasses provided by the video decoder 20 and the video encoder 22, the graphics controller 24 would rarely provide processed video data to the video encoder 22. This path would typically be utilized to provide graphics data to the video encoder 22. Note that the video decoder 20, the video encoder 22, the graphics controller 24 and the frame buffer 26 function in a similar manner as like components in ATI International's All-in-Wonder Board as modified in accordance with the teachings of the present invention.

Figure 2:
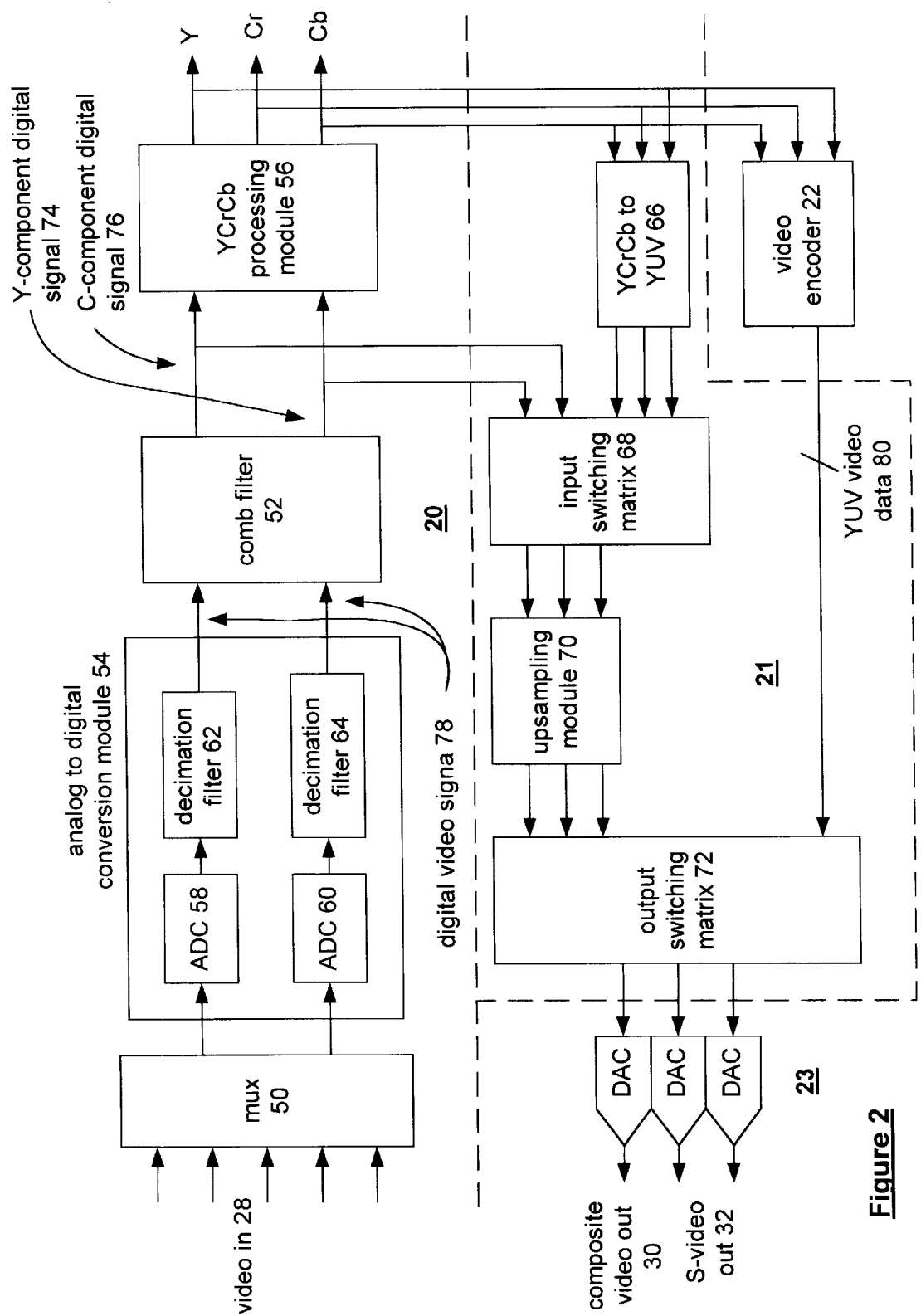
FIG. 2 illustrates a schematic block diagram of the video graphics card in accordance with the present invention.

FIG. 2 illustrates a schematic block diagram of the video decoder 20, the output control module 21 and the DAC module 23. The video decoder 20 includes a multiplexor 50, an analog digital conversion module 54, a comb filter 52, and a YCrCb processing module 56. The analog-to-digital conversion module 54 includes two analog-to-digital converters 58 and 60 and two decimation filters 62 and 64. The multiplexor 50 is operably coupled to receive the video input signals 28 and, based on a select signal, provides the selected video signals to the analog-to-digital conversion module 54. The A/D conversion module 54 receives the analog signals, converts them to digital signals, and then filters them to produce digital video signals 78.

The comb filter 52 further filters the digital video signal 78 to produce a Y component digital signal 74 and a C component digital signal 76. The Y and C component digital signals 74 and 76 are provided to the YCrCb processing module 56 and to an input switching matrix 68 of the output control module 21. The YCrCb processing module 56, processes the Y and C component digital signals 74 and 76 to produce YCrCb video data.

The output control module 21 includes a YCrCb to YUV converter 66, the input switching matrix 68, up sample module 70, and an output switching matrix 72. The YCrCb to YUV conversion module 66 is operably coupled to receive the YCrCb output from the processing module 56. The YUV resultant data is provided to the input switching matrix 68. Based on control signals, the input switching matrix 68, which may include a plurality of multiplexors, selects the Y and C component digital signals 74 and 76 to be provided to the up sampling module 70. Alternatively, the commands could instruct the input switching matrix 68 to provide the YUV data provided by the YCrCb to YUV converter 66 to the up sampling module. Further note that input command signals may cause the input switching matrix 68 to provide a combination of the Y and C component digital signals and the YUV signals to the up sampling module 70, which changes the sampling frequency of the signals to match the desired output sampling frequencies.

The output switching matrix 72, which may include a plurality of multiplexors, receives the output of the up sampling module 70 and the YUV video data 80 from the video encoder 22. Based on output commands, the output switching matrix 72 provides the output of the up sampling module 70, the YUV video data 80, or a combination thereof to the digital-to-analog conversion module 23. As shown, the DAC module 23 includes three separate digital-to-analog converters.

Figure 3:
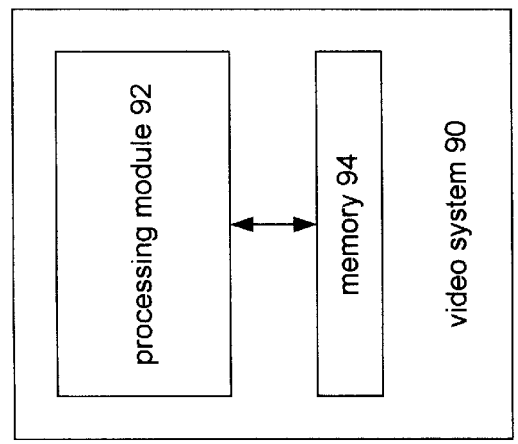
FIG. 3 illustrates a schematic block diagram of an alternate video system in accordance with the present invention.

FIG. 3 illustrates a schematic block diagram of a video system 90 that includes a processing module 92 and memory 94. The processing module 92 may be a single processing entity or a plurality of processing entities. Such a processing entity may be a microprocessor, microcomputer, microcontroller, central processing unit, digital signal processor, state machine, logic circuitry, and/or any device that manipulates information based on operational instructions. The memory 94 may be a single memory device or a plurality of memory devices. Such a memory device may be a read-only memory, random access memory, floppy disk memory, hard disk memory, reprogrammable memory, magnetic tape memory, DVD memory, and/or any device that stores digital information. Note that if the processing module implements one or more of its functions using a state machine or logic circuitry, the memory storing the corresponding operational instructions is embedded within the circuitry that comprises the state machine and/or logic circuitry.

The memory 94 stores a plurality of operational instructions that, when executed by the processing module 92, causes the processing module to processes incoming video to a plurality of output video sources. The operational instructions stored in memory 94 and executed by processing module 92 will be discussed in further detail with reference to FIG. 4.

Figure 4:
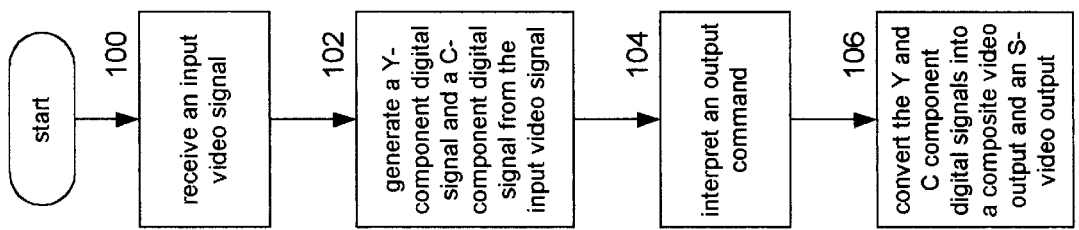
FIG. 4 illustrates a logic diagram of a method for processing video signals to a plurality of video outputs in accordance with the present invention.

FIG. 4 illustrates a logic diagram of a method for processing incoming video signals through a plurality of output video sources. The process begins at step 100 where at least one input video signal is received. The process then proceeds to step 102 where a Y component digital signal and a C component digital signal is produced from the received input signal. The process then proceeds to step 104 where an output command is interpreted. Note that the output command may be obtained via accessing a default register, receiving a user input, and/or determining system configuration. The determination of system configuration may include determining whether a television 30 monitor is connected to a composite video output or the S video output. If coupled, the output command may cause the bypassing of the graphics controller, such that the video signals are provided directly from the video decoder to the output control module.

The process then proceeds to step 106 where the Y and C component digital signals are converted into a composite video output and an S video output. In addition to converting the Y and C component digital signals to video outputs, the Y Cr Cb data may be received. Upon receiving the Y Cr Cb data, it is processed to produce an encoded composite video signal, encoded Y component video data, and an encoded C component video data The encoded composite video data, encoded Y component video data, and encoded C component video data are then processed to generate the composite video output and the S video output. Note that the Y Cr Cb data may be representative of graphics data and/or processed video signals. Further note that RGB data may be generated from the Y Cr Cb data. In this instance, the RGB data would then be provided to a computer monitor such that a single video source may be provided to a plurality of output sources without undue processing by the video graphics processing.

The preceding discussion has presented a method and apparatus for receiving a video input signal and providing it to one or more of a plurality of video sources. When the video signal is to be provided to a composite video output or S video output, the present invention provides at least one graphics controller bypass path such that the graphics controller does process the video data prior to being outputted. By avoiding utilization of the graphics controller, processing resources of the graphics controller are preserved.

What is claimed is:

1. A video system in a computer system comprises:
   a video decoder operably coupled to receive at least one input video signal to the computer system, wherein the video decoder includes:
   an analog to digital conversion module for converting the at least one input video signal into a digital video signal;
   comb filter operably coupled to the analog to digital conversion module, wherein the comb filter receives the digital video signal and produces therefrom a Y-component digital signal and a C-component digital signal;
   a digital to analog module;
   a graphics controller; and
   output control module operably coupled to the video decoder and the digital to analog module, wherein the video decoder, based on an output command, bypasses the graphics controller and provides the Y-component digital signal and the C-component digital signal to the output control module, wherein the output control module based on the output command, provides the Y-component digital signal and the C-component digital signal to the digital to analog module, and wherein the digital to analog module produces a composite video output and an S-video output from the Y-component digital signal and the C-component digital signal.

2. The video system of claim 1 further comprises:
   a video encoder operably coupled to receive YUV video data from the video decoder in response to a second output command and to produce therefrom encoded composite video data, encoded Y-component video data, and C-component video data; and
   wherein the output control module is operably coupled to receive the encoded composite video data, the encoded Y-component video data, and the C-component video data and, based on the second output command, to provide the encoded composite video data, the encoded Y-component video data, and the C-component video data to the digital to analog module.

3. The video system of claim 2, wherein the video further comprises:
   YUV processing module operably coupled to receive the Y-component digital signal and the C-component digital signal and to produce therefrom the YUV video data.

4. The video system of claim 2, wherein:
   the graphics controller is operably coupled to the video decoder and the video encoder, wherein the graphics controller produces the YUV video data based on at least one of: graphics data and a representation of the Y-component digital signal and the C-component video signal.

5. The video system of claim 4, wherein the graphics controller further comprises an RGB engine operably coupled to receive the YUV video data and to produce therefrom an RGB output.

6. The video system of claim 2, wherein the output control module comprises:
   an input switching matrix operably coupled to receive Y-component digital signal, the C-component digital signal, the encoded composite video data, the encoded Y-component video data, and the C-component video data and, based on the output command or the second output command, selects the Y-component digital signal and the C-component digital signal or the encoded composite video data, the encoded Y-component video data, and the C-component video data to produce a selected output;
   upsampling module operably coupled to receive the selected output and to produce therefrom a rate adjusted output; and
   an output switching matrix operably coupled to receive the rate adjusted output and to output, based on the output command or the second output command, the rate adjusted output to the digital to analog module.

7. The video system of claim 1, wherein the input video signal includes at least one of: NTSC video signals, PAL video signals, SECAM video signals, composite video signals, and S-video video signals.

8. The video system of claim 1, wherein the composite video output or the S-video output comprises a video format compliant with at least one of: NTSC and PAL.

9. A method for processing video signals in a computer system, the method comprises the steps of:
   a) receiving at least one input video signal to the computer system to produce a received input video signal;
   b) generating a Y-component digital signal and a C-component digital signal from the received input video signal;
   c) interpreting an output command;
   d) bypassing a graphics controller based upon the interpretation of the output command and sending the Y-component digital signal and the C-component digital signal to an output control module; and
   e) converting the Y-component digital signal and the C-component digital signal into a composite video output and an S-video output in response to the output command.

10. The method of claim 9, wherein step (c) further comprises obtaining the output command, wherein the output command is obtained via at least one of: accessing a default register, receiving a user input, and determining system configuration.

11. The method of claim 9 further comprises:
   receiving YUV video data;
   producing encoded composite video data, encoded Y-component video data, and C-component video data from the YUV video data; and
   generating the composite video output and the S-video output from the encoded Y-component video data, and the C-component video data based on a second output command.

12. The method of claim 11, wherein the YUV video data comprises at least one of: graphics data and a representation of the Y-component digital signal and the C-component video signal.

13. The method of claim 11 further comprises generating an RGB output from the YUV video data.

14. A video system in a computer system comprises:

a processing module; and memory operably coupled to the processing module, wherein the memory includes operational instructions that cause the processing module to: (a) receive at least one input video signal to produce a received input video signal; (b) generate a Y-component digital signal and a C-component digital signal from the received input video signal; (c) interpret an output command; (d) bypass a graphics controller based upon the interpretation of the output command and sending the Y-component digital signal and the C-component digital signal to an output control module; and (e) convert the Y-component digital signal and the C-component digital signal into a composite video output and an S-video output in response to the output command.

15. The video system of claim 14, wherein the memory further comprises operational instructions that cause the processing module to obtain the output command, wherein the output command is obtained via at least one of: accessing a default register, receiving a user input, and determining system configuration.

16. The video system of claim 14, wherein the memory further comprises operational instructions that cause the processing module to:

receive YUV video data;

produce encoded composite video data, encoded Y-component video data, and C-component video data from the YUV video data; and generate the composite video output and the S-video output from the encoded Y-component video data, and the C-component video data based on a second output command.

17. The video system of claim 16, wherein the YUV video data comprises at least one of: graphics data and a representation of the Y-component digital signal and the C-component video signal.

18. The video system of claim 16, wherein the memory further comprises operational instructions that cause the processing module to generate an RGB output from the YUV video data.

* * * * *